(12) United States Patent
Seiler et al.

(10) Patent No.: US 12,318,746 B2
(45) Date of Patent: Jun. 3, 2025

(54) MIXING DEVICE COMPRISING A SEAL

(71) Applicant: Maschinenfabrik Gustav Eirich GmbH & Co. KG, Hardheim (DE)

(72) Inventors: Andreas Seiler, Tauberbischofsheim (DE); Stefan Münkel, Külsheim (DE); Tobias Matter, Osterburken (DE)

(73) Assignee: Maschinenfabrik Gustav Eirich GmbH & Co. KG, Hardheim (DE)

( * ) Notice: Subject to any disclaimer, the term of this patent is extended or adjusted under 35 U.S.C. 154(b) by 1015 days.

(21) Appl. No.: 16/981,009

(22) PCT Filed: Mar. 14, 2019

(86) PCT No.: PCT/EP2019/056413
§ 371 (c)(1),
(2) Date: Sep. 15, 2020

(87) PCT Pub. No.: WO2019/175305
PCT Pub. Date: Sep. 19, 2019

(65) Prior Publication Data
US 2021/0094007 A1 Apr. 1, 2021

(30) Foreign Application Priority Data
Mar. 16, 2018 (DE) .................... 10 2018 106 184.6

(51) Int. Cl.
*B01F 35/45* (2022.01)
*B01F 29/80* (2022.01)
*B01F 29/83* (2022.01)
*F16J 15/3232* (2016.01)
*B01F 35/30* (2022.01)

(52) U.S. Cl.
CPC .............. *B01F 35/45* (2022.01); *B01F 29/82* (2022.01); *B01F 29/83* (2022.01); *F16J 15/3232* (2013.01); *B01F 2035/3513* (2022.01)

(58) Field of Classification Search
CPC .......... B01F 29/80; B01F 29/81; B01F 29/82; B01F 29/83; B01F 35/45; B01F 2035/3512; B01F 2035/3513; F16J 15/3232
See application file for complete search history.

(56) References Cited

U.S. PATENT DOCUMENTS

| 3,215,297 A | 11/1965 | Acton et al. |
| 3,568,871 A | 3/1971 | Livingstone |
| 3,830,472 A | 8/1974 | Janhsen et al. |
| 3,831,950 A * | 8/1974 | Bentley ................ F16J 15/3236 277/921 |

(Continued)

FOREIGN PATENT DOCUMENTS

| CN | 107158985 A * | 9/2017 | ........ B01F 15/00058 |
| DE | 970 311 C | 9/1958 | |

(Continued)

*Primary Examiner* — Marc C Howell
*Assistant Examiner* — Patrick M McCarty
(74) *Attorney, Agent, or Firm* — MEDLER FERRO WOODHOUSE & MILLS PLLC

(57) ABSTRACT

A mixing device includes a mixing container for receiving mixing material and a mixer cover, wherein a first seal and a second seal is provided between the mixing container and the mixer cover. The first seal and the second seal are so arranged that a first air space is formed between the first seal and the second seal.

19 Claims, 2 Drawing Sheets

(56) References Cited

U.S. PATENT DOCUMENTS

Figure 1:
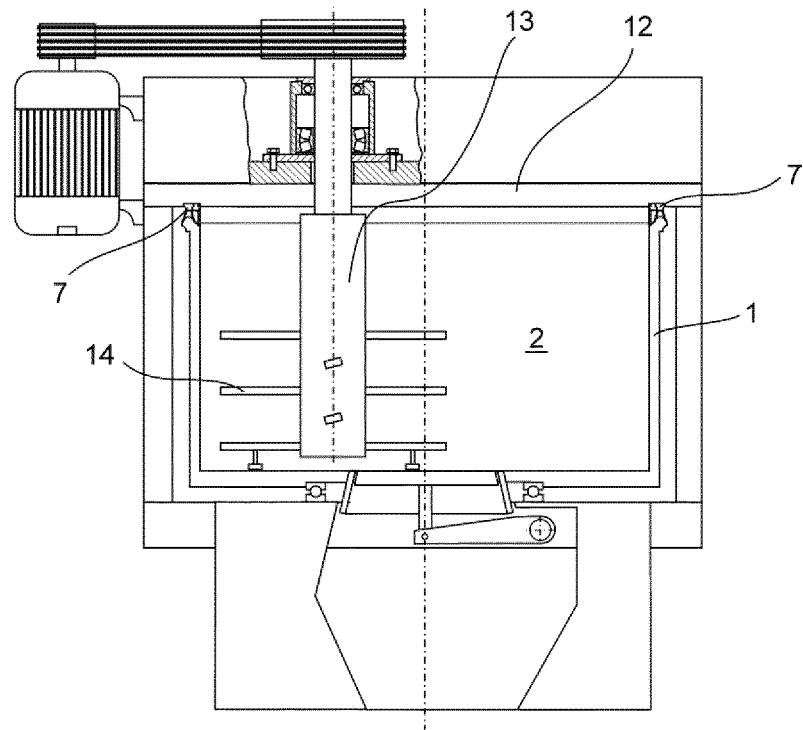

| | | | | |
|---|---|---|---|---|
| 4,337,956 A | * | 7/1982 | Hopper | F16J 15/3232 |
| | | | | 277/552 |
| 4,650,340 A | | 3/1987 | Krawczyk et al. | |
| 5,085,443 A | * | 2/1992 | Richards | F26B 5/08 |
| | | | | 277/944 |
| 7,946,752 B2 | | 5/2011 | Swartz et al. | |
| 2005/0040266 A1 | * | 2/2005 | Gerl | B02C 17/161 |
| | | | | 241/172 |
| 2011/0249527 A1 | | 10/2011 | Seiler et al. | |
| 2017/0143184 A1 | * | 5/2017 | Wegener | D06F 39/026 |

FOREIGN PATENT DOCUMENTS

| | | | | |
|---|---|---|---|---|
| DE | 20 57 890 A1 | | 6/1972 | |
| DE | 35 20 409 A1 | | 12/1986 | |
| DE | 19512186 A1 | * | 10/1996 | F16J 15/46 |
| DE | 199 08 845 C1 | | 7/2000 | |
| DE | 20 2015 003 751 U1 | | 8/2016 | |
| EP | 0 146 011 A2 | | 6/1985 | |
| EP | 0 354 190 A1 | | 2/1990 | |
| EP | 1 424 009 A2 | | 6/2004 | |
| FR | 2480711 A3 | * | 10/1981 | |
| JP | 4403170 B2 | * | 1/2010 | |
| RU | 2476260 C1 | | 2/2013 | |
| RU | 2521571 C2 | | 6/2014 | |
| SU | 77376 A1 | | 11/1949 | |

\* cited by examiner

MIXING DEVICE COMPRISING A SEAL

CROSS-REFERENCE TO PRIOR APPLICATIONS

This application is a § 371 National Stage Application of PCT International Application No. PCT/EP2019/056413 filed Mar. 14, 2019, which claims priority to German Application No. 10 2018 106 184.6 filed on Mar. 16, 2018, both of which are incorporated herein in their entirety.

The present invention concerns a mixing device having a mixing container for receiving mixing material and a mixer cover, wherein a first seal is provided between the mixing container and the mixer cover.

Mixing tools are frequently arranged within the mixing container, which move the mixing material in the mixing container. The seals serve to prevent or at least reduce any escape of mixing material or mixing material dusts from the mixing container during the mixing operation. Particularly in the case of pharmaceutical or toxic mixing material constituents care is also to be taken to ensure that mixing material cannot in any way escape into the surroundings.

In addition it is precisely in applications which make high demands on hygienic cleanability of all surfaces coming into contact with the mixing material that particular attention has to be paid to ease of cleaning the seal between the mixer cover and the mixing container.

DE 3520409A1 already discloses a sealing device fixed to a circular container cover, the sealing device comprising a sealing lip which is in contact with a cylindrical mixing container on an edge surface thereof. If the sealing device is no longer bearing uniformly over the entire periphery of the mixing container or if the contact pressure decreases due to material ageing or expansion by virtue of changes in temperature then parts of mixing material can escape from the mixing container directly into the adjoining surroundings, by overcoming the seal. There are mixing containers which are rotated about an axis of rotation during the mixing operation. In that case the container cover does not have to be rotated together with the mixing container. It is in particular in such cases that particularly high demands are made on the seal.

Taking the described state of the art as the basic starting point therefore the object of the present invention is to provide a mixing device which at least alleviates the described disadvantages.

According to the invention that is achieved in that arranged between the mixing container and the mixer cover are the first and a second seal which are so arranged that a first air space is formed between the first and the second seal. The use of two seals spaced from each other so that the air space is formed markedly enhances sealing integrity in particular in relation to rotating mixing containers.

In a preferred embodiment the mixing container is cylindrical and has an edge surface, wherein the first seal is in contact with the edge surface, wherein preferably also the second seal is in contact with the edge surface. The edge surface can be convexly curved.

During the mixing operation a small partial amount of mixing material which has escaped past the first seal can be deposited in the air space formed between the two sealing lips and the mixer cover and the mixing container. Even if only very little mixing material gets past the second seal to the surroundings by virtue of the two-part configuration of the sealing system product residues in the air space after the conclusion of the mixing operation are in principle unwanted or have to be removed before starting the next mixing operation. In addition even with the two-part seal it is not completely out of the question that minimal mixing material constituents escape past both seals and thus pass into the surroundings.

In a preferred embodiment it is therefore provided that the first seal seals off the first air space with respect to the interior of the mixing container while the second seal seals off the first air space with respect to the exterior of the mixing container and there is provided a first fluid passage having a first fluid passage opening which is arranged in the first air space, by way of which fluid can be fed into the first air space or fluid can be sucked out of the first air space.

For example a flushing gas could be fed by way of the fluid passage opening during the mixing operation. Alternatively it would also be possible to perform a suction removal operation in order to suck out mixing material constituents which have possibly passed into the first air space. Furthermore it is possible for cleaning liquid to be introduced into the air space by way of the first fluid passage opening to clean the seal.

The sealing apparatus can for example comprise two coaxially mutually arranged sealing lips which are fixed to the mixer cover and are in contact with at least one contact surface of the mixing container. The contact surface could be an edge surface of the mixing container. Then the two sealing lips are spaced from each other in the radial direction. Alternatively the coaxially mutually arranged sealing lips could also be fixed to the mixing container and be in contact with at least one contact surface on the mixer cover. Finally it would also be possible for a seal to be fixed to the mixing container and a seal to the mixer cover, and to be in contact with the respective contact surfaces of the other part.

In a further preferred embodiment the first and the second seal are elastic, wherein the first and the second seal are so arranged that the first seal is deflected elastically in the direction of the interior of the mixing container while the second seal is deflected elastically in the direction of the exterior of the mixing container. If the mixing container is of a rotationally symmetrical configuration about an axis of rotation, like for example cylindrical with a cylinder axis, this means that the first seal is deflected elastically in the direction of the axis of rotation of the mixing container while the second seal is deflected elastically in a direction away from the axis of rotation of the mixing container.

That configuration ensures that both seals exert a force in the direction of the first air space. Particularly when the first air space is sucked out by way of the first fluid passage opening that will have the result that the seals are moved even more strongly in the direction of the air space, which enhances sealing integrity.

In a further preferred embodiment it is provided that the first and the second seal are elastic, wherein the first and the second seal are so arranged that both the first seal and also the second seal are deflected in the direction of the interior of the mixing container. If the mixing container is of a rotationally symmetrical configuration around an axis of rotation like for example cylindrical relative to a cylinder axis the first and the second seal can be so arranged that both the first seal and also the second seal are deflected in the direction of the axis of rotation of the mixing container.

To further enhance sealing integrity and at the same time to reduce the frictional resistance on the contact surface bead-shaped raised portions directed inwardly, that is to say in the direction of the first air space, can be arranged at the outer end of the seal, the raised portions leading to linear contact of the contact surfaces. The seal is fixed either to the mixer cover or to the mixing container. The outer end of the seal is the end of the seal that faces away from the element (mixer cover or mixing container) to which it is fixed.

In a further preferred embodiment there is provided a third seal arranged between the mixer cover and the mixing container in such a way that a second air space is formed between the first seal and the third seal and possibly the mixing container and the mixer cover. The third seal can be in contact with a corresponding contact surface. In principle a small spacing can remain between the third seal and the corresponding contact surface.

That measure also results in a further improvement in sealing integrity.

In a further preferred embodiment it is provided that the first and the third seal as well as the mixer cover and the mixing container are of such a configuration and arrangement that the third seal contacts the mixing container at a position or has the smallest spacing relative to the mixing container at a position that is geodetically lower than the position at which the first sal contacts the mixing container.

The idea behind this measure is that the mixing material which possibly overcomes the third seal would have to be transported upwardly against the force of gravity to reach the first seal. The arrangement according to the invention of the first and the third seals thus reduces the proportion of mixing material that reaches the first seal.

In a further preferred embodiment there is provided a second fluid passage having a second fluid passage opening in the first or second air space, by way of which a fluid can be fed into the first or second air space or can be sucked out of the first or second air space.

If the second fluid passage opening like the first fluid passage opening is arranged in the first air space then as a result a fluid flow can be produced in the first air space so that particles in the air space are possibly sucked away. Arranging both fluid passage openings in the same air space therefore prevents air from being uncontrolledly sucked out of the mixing chamber by the seals arranged closer to the mixing container axis.

Thus that can be implemented for example in such a way that the first fluid passage opening is arranged closer to the upper edge of the mixing container wall than the second fluid passage opening. For example that can be effected by the first fluid passage opening extending by way of a tube portion into the air space.

If the second fluid passage opening is arranged in the second air space a gas flow can be produced between the first and second air spaces to suck particles both out of the first air space and also the second air space. In addition a cleaning liquid can be used to clean the air spaces and the seals defining same. In a preferred embodiment the gas flow is from the first air space into the second air space.

In a further preferred embodiment there is provided at least one fluid flow machine, with which fluid is fed into the air space by way of the first fluid passage and fluid is sucked out of the air space by way of the second fluid passage.

It is further advantageous if there is provided a mixer stand and the mixing container is mounted rotatably about an axis of rotation relative to the mixer stand and the mixing device has a drive with which the mixing container can be rotated about the axis of rotation, wherein the mixer cover is fixed to the mixer stand, wherein preferably at least the first and the second seal and best also the third seal are fixed to the mixer cover and in the closed position contact the mixing container.

In this embodiment the mixing container can be rotated about its axis of rotation while the mixer cover is not rotated. Particularly when the mixing container is rotated relative to the seal particularly high demands are made on the sealing arrangement. In addition situations of use are conceivable in which a vacuum is generated within the mixing container in order for example to degas the mixing material.

To enhance sealing integrity it is advantageous if the seals bear against counterpart running surfaces of the mixing container or the mixer cover, preferably the mixing container, that are inclined relative to the horizontal.

In a preferred embodiment the mixer cover can be reciprocated between an open position in which the mixer cover opens an inlet opening and a closed position in which the mixer cover closes the inlet opening.

Figure 2:
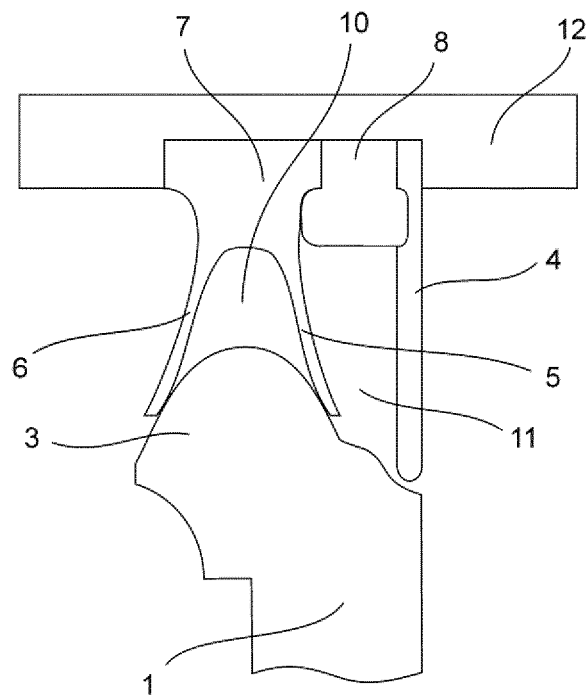
Figure 3:
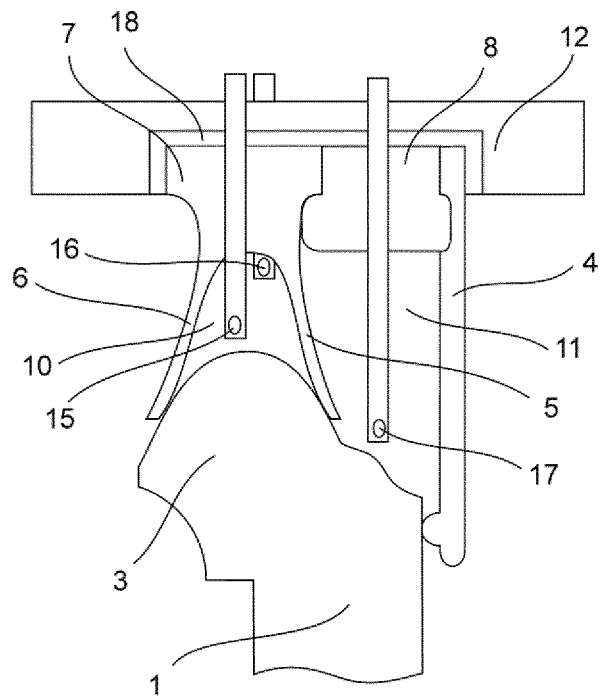
Figure 4:
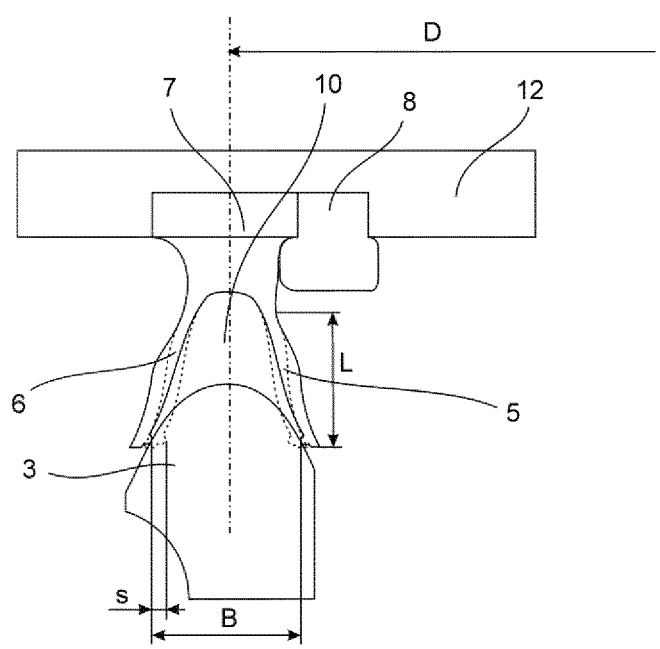

Further advantages, features and possible uses of the present invention will be clearly apparent from the description hereinafter of a preferred embodiment and the accompanying Figures in which:

FIG. 1 shows a sectional view through an embodiment according to the invention of a mixing device, FIG. 2 shows a first detail sectional view, FIG. 3 shows a second detail sectional view of a variant of FIG. 2, and FIG. 4 shows a third detail sectional view of a further variant of FIG. 2.

FIG. 1 shows a sectional view of a mixing device according to the invention. The mixing device has a mixing container 1 which is substantially in the form of a hollow cylinder. A hollow space 2 for receiving mixing material is arranged in the interior of the mixing container 1. The mixing container 1 is open upwardly. It is closed by a mixer cover 12 in the position shown in FIG. 1. A mixer shaft 3 with corresponding mixing tools 14 is arranged in the mixer cover 12. The mixing container 1 can be rotated about an axis of rotation which is not on the axis of the mixer shaft 13. The consequence of this is that the mixer cover does not rotate together with the mixing container 1. In order nonetheless to seal off the interior 2 of the mixing container 1 relative to the surroundings in the closed position a sealing element 7 which is described in greater detail hereinafter is disposed between the mixer cover 12 and the upper edge of the mixing container 1.

FIGS. 2 and 3 show two partial sectional views of the upper edge of the mixing container 1. It will be seen that the upper edge of the mixing container 1 has an upwardly extending peripheral bead 3 having two flank surfaces which extend on the one hand outwardly and on the other hand inwardly. Arranged on the mixer cover 12 is a sealing element 7 which has two sealing lips 5, 6 forming a V-shape, functioning as the first seal 5 and the second seal 6. The first seal 5 bears against the inwardly facing flank surface of the bead 3 while the second seal 6 bears against the outwardly facing flank surface of the bead 3. The two seals are elastically movable by virtue of being in the form of a sealing lip. In the illustrated position they are already pressed apart by the bead 3 on the upper edge of the mixing container 1 so that the two seals, that is to say the first seal 5 and the second seal 6, exert a force on the bead 3. In the illustrated embodiment there is a third seal 4 which is also fixed to the container cover 12.

The third seal 4 functions here as a preliminary seal and serves to retain large amounts of mixing material that are hurled with high dynamics into the sealing region. That can occur in particular when the mixer shaft 13 is rotating at a high speed. In the illustrated embodiment the third seal 4 is of plastic and runs on a corresponding contact surface at the end of the inwardly facing flank surface of the bead 3. Alternatively the seal 4 at the lower end can have a thickened portion which faces outwardly away from the mixing container axis and which bears against the inside of the smooth mixing container wall. The spacing between the contact surface on the bead 3 and the preliminary seal is typically between 0.1 mm and at most 3 mm. Ideally the preliminary seal slides on the contact surface. To avoid the seals wearing into the contact surfaces the contact surfaces are preferably protected with a particularly hard and wear-resistant surface by hardening or coating or a suitable choice of material. It is to be noted that the position at which the third seal contacts the mixing container (FIG. 3) or the position of the mixing container, that is closest to the third seal (FIG. 2), is geodetically lower than the position at which the first seal contacts the mixing container.

The sealing device 7 with the two sealing lips forming the first seal 5 and the second seal 6 in the closed position of the mixer cover bears on the peripherally extending bead 3 with inclined flank surfaces and provides for a sealing action from the first air space 10 in both directions, that is to say both in the direction of the container exterior and also in the direction of the container interior or in the direction of the second air space 11 formed by the third seal 3, the first seal 5 as well as the mixing container 1 and the mixer cover 12. A holding ring 8 which is screwed to the mixer cover 12 is provided for fixing the seals to the mixer cover 12. That holding ring 8 serves for providing a force-locking or positively locking connection of the seals to the mixer cover 12. Alternatively, for directly fixing the sealing device in the mixer cover, the sealing device 7 can be assembled to form a unit with the holding ring 8 and possibly the seal 4 by means of a holding frame 18, in which case that unit is easily releasably connected to the mixer cover 12, for example by way of a bayonet fixing, and can be removed as a unit, for example for cleaning or for replacement.

As can be seen in particular from FIG. 3 there is a first fluid passage opening 15, by way of which a fluid can be introduced into the first air chamber 10. For example a second fluid passage opening could also represent a connection to the first air space 10 so that a flushing gas can be introduced into and removed by suction from the air space 10 in order to remove mixing material constituents which have possibly passed into the air space 10. To increase the sealing action of the first and second seals it is possible for the fluid feed and the fluid discharge to be set in such a way that a slight reduced pressure is built up in the first air space 10, that presses the first seal 5 and the second seal 6 against the bead 3. A suitable reduced pressure is in the range of between 0.1 and 100 mbars and particularly preferably between 2 and 30 mbars. Alternatively a further fluid passage opening could be positioned in the region between the first seal 5 and the third seal 4. In this case, depending on the respective requirements, a flushing air can be moved between the first air space 10 and the second air space 11.

FIG. 4 shows a variant of the seal of FIG. 2. The annular seal 7 is of a mean diameter D and comprises the sealing lips 5 and 6 which each have a constriction at a spacing L relative to the outer end of the seal so that upon contact between the sealing lips and the bead 3 the sealing lip is preferably deflected outwardly about that constriction. The sealing lips 5 and 6 are moved outwardly by the deflection s so that they bear with a defined force over a width B against the bead 3. Here, comparably to the seal 4 in FIG. 3, the sealing lips 5 and 6 are provided at the outer end with a raised portion projecting in the direction of the contact surface in order to achieve a contact which as much as possible is in the form of a line between the seal and the contact surface.

In the unloaded state the seal at the outer end of the sealing lips 5 and 6 has a clearance of B−2s while in the loaded state it involves a clearance B between the contact points at the contact surface.

A particularly good sealing action is achieved if the geometrical parameters of the seal are in the following preferred range of values:
$L/D=0.01-0.05$
$s/L=0.05-0.5$
$B/D=0.01-0.1$.

Particularly when, in the case of a pivotable mixer cover, the cover is moved into its closed position a flushing liquid can also be passed between the seals to clean the seals.

The fluid feed and discharge can also be effected interval-wise and does not have to be carried out uninterruptedly during the entire mixer or cleaning operation.

LIST OF REFERENCES

1 mixing container
2 hollow space
3 bead
4 third seal
5 first seal
6 second seal
7 sealing element
8 holding ring
10 first air space
11 second air space
12 mixer cover
13 mixer shaft
14 mixing tools
15, 16, 17 fluid passage opening
18 holding frame

The invention claimed is:

1. A mixing device comprising a mixing container for receiving mixing material and a mixer cover,
   wherein a first seal is provided between the mixing container and the mixer cover, wherein there is a mixer stand and the mixing container is mounted rotatably about an axis of rotation with respect to the mixer stand and the mixing device has a drive with which the mixing container can be rotated about the axis of rotation,
   wherein the mixer cover is fixed to the mixer stand,
   wherein there is provided a second seal and the first and the second seal are so arranged that a first air space is formed between and contacts the first seal and the second seal,
   wherein the first seal seals off the first air space with respect to the interior of the mixing container while the second seal seals off the first air space with respect to the exterior of the mixing container and there is provided a first fluid passage having a first fluid passage opening which is arranged in the first air space, and
   wherein the first fluid passage opening is configured to feed fluid into the first air space to contact the first and second seal or to suck out fluid from the first air space in order to suck out mixing material constituents which may be in contact with the first seal or the second seal.

2. The mixing device according to claim 1, wherein the mixer cover can be reciprocated between an open position in which the mixer cover opens an inlet opening and a closed position in which the mixer cover closes the inlet opening.

3. The mixing device according to claim 1, wherein there is provided a one-piece sealing element having at least two sealing lips, the two sealing lips forming the first and the second seals.

4. The mixing device according to claim 1, wherein the mixer cover has a recess for receiving at least one seal, wherein there is provided a holding ring which is fitted into the recess together with the at least one seal and is fixed to the mixer cover or an element connected to the mixer cover, wherein the holding ring provides a force-locking and/or positively locking fixing for the at least one seal.

5. The mixing device according to claim 1, wherein the first and the second seal are fixed to the mixer cover and contact the mixing container.

6. The mixing device according to claim 1, wherein the seals bear against counterpart running surfaces of the mixing container or the mixer cover that are inclined relative to the horizontal.

7. The mixing device according to claim 1, wherein the seals bear against counterpart running surfaces of the mixing container that are inclined relative to the horizontal.

8. The mixing device according to claim 1, wherein the mixing container is cylindrical and has an edge surface, wherein the first seal is in contact with the edge surface.

9. The mixing device according to claim 8, wherein also the second seal is in contact with the edge surface.

10. The mixing device according to claim 1, wherein the first and the second seal are elastic, wherein the first and the second seal are so arranged that the first seal is deflected elastically in the direction of the interior of the mixing container while the second seal is deflected elastically in the direction of the exterior of the mixing container.

11. The mixing device according to claim 10, wherein the mixing container is of a rotationally symmetrical configuration about the axis of rotation and the first and second seals are so arranged that the first seal is deflected elastically in the direction of the axis of rotation of the mixing container while the second seal is deflected elastically in a direction away from the axis of rotation of the mixing container.

12. The mixing device according to claim 1, wherein the first and the second seal are elastic, wherein the first and the second seal are so arranged that both the first seal and also the second seal are deflected in the direction of the interior of the mixing container.

13. The mixing device according to claim 12, wherein the mixing container is of a rotationally symmetrical configuration around the axis of rotation and the first and the second seal are so arranged that both the first seal and also the second seal are deflected in the direction of the axis of rotation of the mixing container.

14. The mixing device according to claim 1, wherein there is provided a third seal arranged between the mixer cover and the mixing container in such a way that a second air space is formed between the first seal and the third seal.

15. The mixing device according to claim 14, wherein the first and the third seal as well as the mixer cover and the mixing container are of such a configuration and arrangement that the third seal either contacts the mixing container at a position which is geodetically lower than the position at which the first seal contacts the mixing container or has the smallest spacing relative to the mixing container at a position which is geodetically lower than the position at which the first seal contacts the mixing container.

16. The mixing device according to claim 14, wherein there is provided a second fluid passage opening in the first or second air space, by way of which a fluid can be fed into the second air space or can be sucked out of the second air space.

17. The mixing device according to claim 14, wherein the first seal, the second seal, and the third seal are fixed to the mixer cover and contact the mixing container.

18. The mixing device according to claim 14, wherein there is provided a second fluid passage opening in the first or second air space, by way of which a fluid can be fed into the first air space or can be sucked out of the first air space.

19. The mixing device according to claim 18, wherein there is provided at least one fluid flow machine, with which fluid is fed into the air space by way of the first fluid passage opening and/or fluid is sucked out of the air space by way of the second fluid passage opening.

* * * * *